United States Patent
Suzuki et al.

(10) Patent No.: US 6,190,728 B1
(45) Date of Patent: Feb. 20, 2001

(54) PROCESS FOR FORMING THIN FILMS OF FUNCTIONAL CERAMICS

(75) Inventors: Hisao Suzuki, Aichi; Tomio Hirano; Tatsuya Wada, both of Shizuoka, all of (JP)

(73) Assignee: Yazaki Corporation, Tokyo (JP)

( * ) Notice: Under 35 U.S.C. 154(b), the term of this patent shall be extended for 0 days.

(21) Appl. No.: 09/161,308

(22) Filed: Sep. 28, 1998

(30) Foreign Application Priority Data

Sep. 29, 1997 (JP) .................................................... 9-279418

(51) Int. Cl.[7] .................................................... B05D 5/12
(52) U.S. Cl. .................... 427/126.3; 427/226; 427/419.3
(58) Field of Search ............................... 427/226, 126.3, 427/443.2, 419.3

(56) References Cited

U.S. PATENT DOCUMENTS

| | | | |
|---|---|---|---|
| 5,198,269 | 3/1993 | Swartz et al. . | |
| 5,719,417 | * 2/1998 | Roeder et al. | 257/295 |
| 5,817,170 | * 10/1998 | Desu et al. | 117/2 |
| 5,913,117 | * 6/1999 | Lee | 438/240 |

* cited by examiner

Primary Examiner—Brian K. Talbot
(74) Attorney, Agent, or Firm—Armstrong, Westerman, Hattori, McLeland & Naughton

(57) ABSTRACT

A process for forming a functional ceramic thin film eliminating the need of high temperature annealing which has been indispensable in the conventional process is provided. This can be achieved by the process for forming a functional ceramic thin film having a crystal of a composite oxide consisting of two or more metal elements and oxygen, which comprises steps of alternately stacking seeding layers having the same crystalline structure as said composite oxide and formable at a temperature lower than the crystallization temperature of the composite oxide, and layers containing a larger amount of a specified metal element than said seeding layers, and then annealing the resultant layers to form an integral body.

7 Claims, 8 Drawing Sheets

PROCESS FOR FORMING THIN FILMS OF FUNCTIONAL CERAMICS

FIELD OF THE INVENTION

This invention relates to a process for forming a thin film of functional ceramic, such as a thin film composed of a composite oxide of a plurality of metals, particularly to a ferroelectric thin film, for example, PZT, PLZT, etc.

DESCRIPTION OF THE PRIOR ART

Perovskite-type $Pb(Zr_xTi_{1-x})O_3$ ceramics and films which are composite oxides have high ferroelectric property and show excellent piezoelectric and pyroelectric properties, and have been used in many applications such as sensor elements. Recently, not only PZT which is a composite oxide consisting of lead, zirconium and titanium, but also PLZT which is a composite oxide composed of lead, lanthanum, zirconium and titanium have attracted attention for their high ferroelectric properties.

These functional ceramics are generally used in a form of thin films when applied to sensors. They are prepared by forming a thin film consisting of lead, zirconium, and titanium (or their oxides) through sputtering process, chemical vapor deposition (CVD) process, etc. and forming crystals under high temperature condition. In this occasion, heat-resistive substrates such as silicon wafers, alumina or the like have been conventionally employed. However, they are too expensive to be used as substrates, and possibility of using more economical materials have been seeked. However, less expensive materials such as aluminum, glass, etc. have low melting points and cannot be used as substrates of the composite oxide thin films.

Moreover, electrodes made of platinum or the like provided on the substrates for applying the thin films to sensors are expensive, and results in high cost of the whole substrate in respect of materials and workability. At the same time, the above process which is treated at high temperature requires an expensive furnace for high temperature operation, and is disadvantagous also in respect of installation cost.

Recently so-called sol-gel process is one of the most promising methods because it offers precise control of a composition at a molecular level as well as the lower processing temperature.

The inventors of this invention have already demonstrated that it was possible to prepare a ferroelectric PZT thin film at comparatively low temperature, employing as a seeding layer a thin film of lead and titanium (or their compounds) formed by the sol-gel process, and stacking on the seeding layer a layer of lead, zirconium and titanium (or their compounds)which is formed by the sol-gel process and contains relatively large amount of zirconium (This process is hereinafter referred to as "single-seeding process").

However, annealing at 600° C. or more is still required to form a fully functional thin film even by this single-seeding process, which therefore cannot be said as a satisfactorily low temperature.

SUMMARY OF THE INVENTION

It is an object of this invention to provide a process for forming thin films of functional ceramics overcoming the above drawbacks of the conventional art, in other words, a process for forming thin films of functional ceramics without a need of annealing at high temperature.

In order to solve the above problem, there is provided a process for forming a functional ceramic thin film having a crystal of a composite oxide consisting of two or more metal elements and oxygen, which comprises steps of alternately stacking seeding layers having the same crystalline structure as the composite oxide and formable at a temperature lower than the crystallization temperature of the composite oxide, and layers containing a larger amount of a specified metal element than said seeding layers, and then annealing the resultant layers to form an integral body.

DETAILED DESCRIPTION OF THE INVENTION

In this invention it is preferable that content of said specified metal element in the seeding layer is zero, because a desired composite oxide thin layer can be thus obtained at much lower temperature.

This invention is most suitable for the formation of a thin film of a composite oxide of lead, zirconium and titanium having perovskite-type cristal structure, or a thin film of a composite oxide of lead, lanthanum, zirconium and titanium having similarly perovskite-type cristal structure. In these instances, the specified metal element comprises zirconium and lanthanum.

In this invention, the seeding layer has the same crystal structure as the crystal structure of the composite oxide in the object functional ceramics, but its crystallization temperature is lower than that of the composite oxide. Into the crystal structure of the seeding layer is supplied the specified metal element from the layer having more said specified metal element than the seeding layer. Then the crystal grows making this seeding layer as a seed of the crystal, and a generally uniform crystal structure is formed. A favorable composite oxide thin layer can be obtained even at low temperature by thus alternately stacking these layers. (A process of alternately stacking the two layers in this way is hereinafter referred to as "multi-seeding process".)

Through the multi-seeding process, a composite oxide thin film having an excellent ferroelectric property can be obtained at such low temperature as would be impossible with the conventional single-seeding process in which one each of the seeding layer and the layer having more the specified metal element than the seeding layer are stacked, and then annealed to give a functional ceramic thin film having the composite oxide crystal.

In this invention, the seeding layer has preferably a thickness of 10 nm to 40 nm. A uniform and favorable seeding layer is hardly obtainable when the thickness is below 10 nm. When the thickness is over 40 nm, it is difficult to obtain a uniform crystal unless treated at high temperature. On the other hand, the layer containing more the specified metal element has preferably a thickness of 20 nm to 80 nm. Outside the range of thickness above mentioned, it would be difficult to obtain a uniform functional ceramic.

The layers are preferably prepared by chemical solution deposit (CSD) process because this process facilitates a precise control of the thickness of the layers. The CSD process includes a dipping process in which a substrate is dipped into an alcohol solution of alkoxide of desired elements such as lead, titanium, lanthanum, zirconium, and slowly withdrawn while forming a film on the surface, and a spinning process in which the alkoxide alcohol solution is dropped onto the rotating substrate to form the film thereon. The thickness of the film can be controlled by viscosity of the solution, withdrawal speed (dipping process), rotation speed (spinning process), concentration of the solution, etc. The alkoxide of the film thus prepared is hydrolized and an oxide is then formed. The stacked body can be prepared by repeating the abovementioned film formation.

In this invention, the required annealing temperature in oxygen containing atmosphere is at lowest 450° C. At this temperature it is possible to obtain the composite oxide thin film having sufficient dielectric property. Annealing at much higher temperature can be conducted, but the range of 450–600° C. would be appropriate to achieve the object of this invention. If the material for the composite oxide contains a lead compound, the annealing must be conducted in the temperature range where a large evaporation is avoided.

The annealing is generally conducted in air. It is sufficient if the processing atmosphere contains oxygen to such extent as the composite oxide is formed.

The substrate to be used should be heat-resistive to 450° C. or more. A glass substrate is preferably employed in view of its low cost. If a transparent electrode such as ITO is provided on the substrate, the obtained composite oxide thin film can be used as a sensor.

A platinum electrode generally used when transparency is not required is very expensive and needs further processes to be used as an electrode, and thus raises the cost for the substrate. However, according to this invention, an aluminum substrate can be employed because low temperature annealing is possible. In this case, electric conductivity of the aluminum substrate itself can be utilized thus saving formation of a separate electrode, whereby sensor elements can be manufactured at extremely low cost.

An example of this invention is hereinafter explained referring to the attached drawings.

EXPERIMENT

Experiments and measurements were conducted as follows: Lead acetate $Pb(CH_3COO)_2$, zirconium n-propoxide $Zr(OC_3H_7)_4$, and titanium iso-propoxide $Ti[(CH_3)_2CHO]_4$ were used as raw materials. Lead acetate tri-hydrate was dehydrated and dissolved in absolute ethanol by refluxing with $HN_3$ flow to obtain Pb-precursor solution, leading to the suppression of the PbO volatilization during processing.

Then, titanium and/or zirconium alkoxides were mixed with the Pb-precursor solution to form a PT or a PZT precursor solution. (PT means an inclusion of lead (Pb) and titanium (Ti), while PZT means an additional inclusion of zirconium (Zr).) Acetyl acetone was added to stabilize the precursor solutions.

The above method was conducted according to Jpn. J. Appl. Phys.35B (1996) 4896 by H. Suzuki, M. B. Othman, K. Murakami, K. Kaneko and T. Hayashi.

Figure 1:
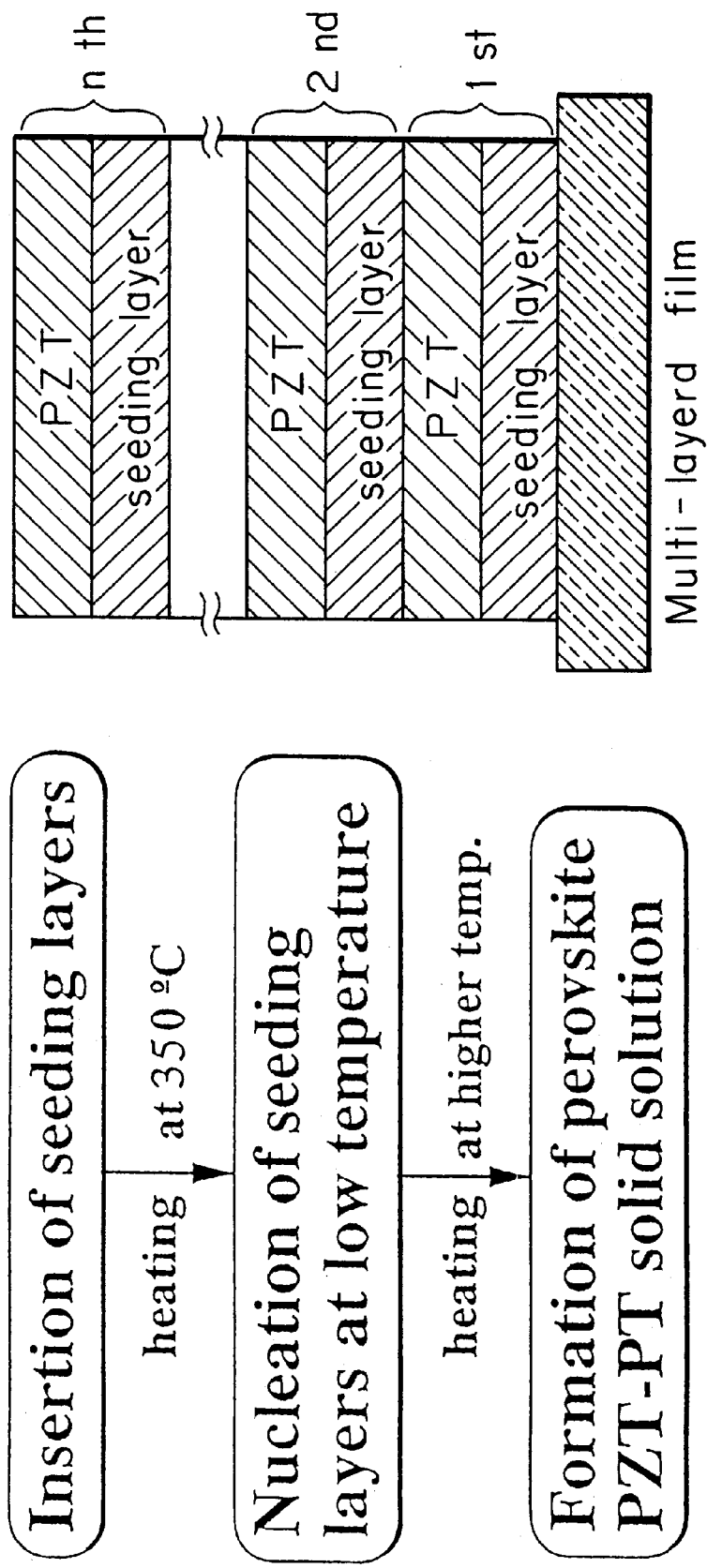
FIG. 1 shows schematically the process for forming a functional ceramic thin film according to this invention.

FIG. 1 shows the schematic illustration of the process for forming functional ceramics according to this invention. PT seeding layers and PZT layers were dip-coated onto a silica glass substrate or a silicon wafer with a Pt electrode by repeating the dipping process.

After each layer was deposited, specimens were dried at 110° C. for 5 min. and then pyrolyzed at 350° C. to remove the residual organic compounds from the precursor films. A PT precursor film was thus deposited between every PZT film to serve as a seeding layer. After these processes specimens were annealed at 410 to 500° C. for two hours in air. In case of PZT, a specimen of $Pb(Zr_xTi_{1-x})O_3$ with X=0.53 corresponding to the morphotoropic phase boundary was chosen to compare with the result of the conventional single-seeding process.

The crystalline phases developed during annealing were identified by X-ray diffraction (XRD). Relative permittivity of the resultant films which were deposited on the silicon wafers with titanium and platinum coatings ($Pt/Ti/SiO_2/Si$ substrate) were measured as a function of the film thickness using a HIP-4284 impedance analyzer. Micro-structure of the resulting film was observed by a field emission type scanning electron microscope (FE-SEM).

Results of the experiment and observation are hereinafter described.

The selection of a seeding layer is very important for a low-temperature processing of PZT thin films. The growth of the epitaxial thin films are strongly effected by a lattice matching among the films, seeding layers and substrate.

Figure 2:
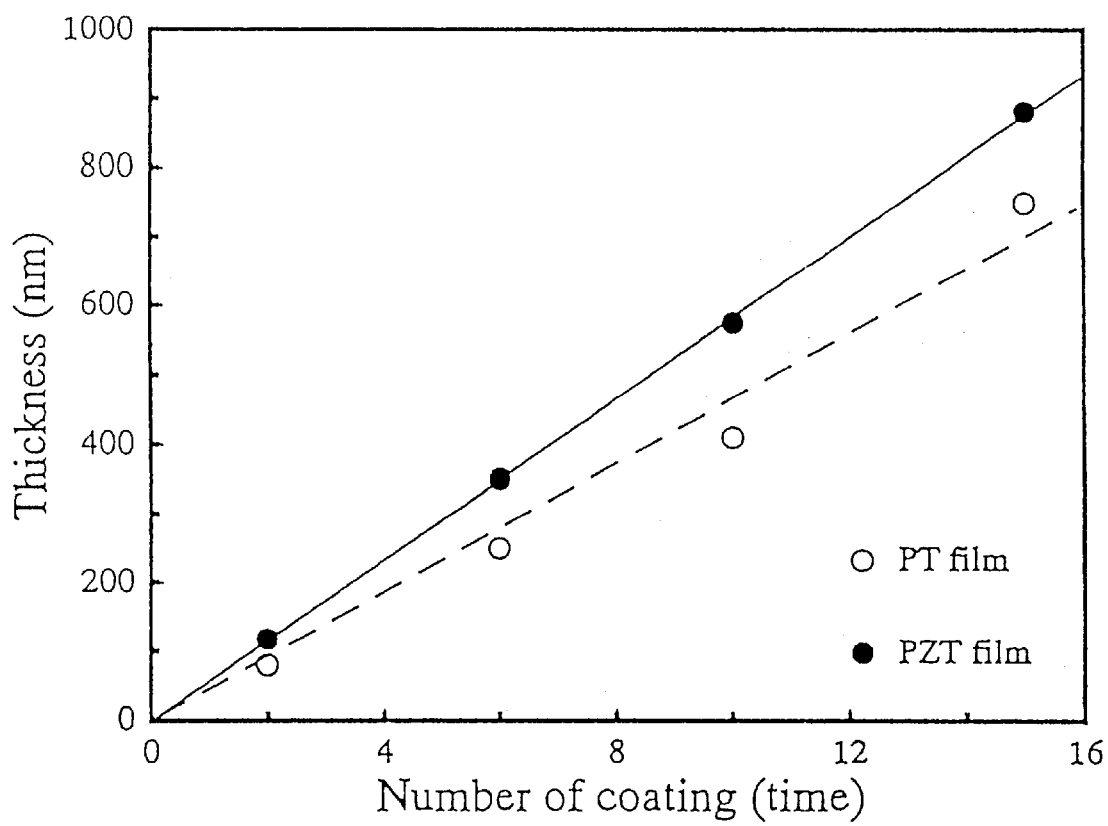
FIG. 2 shows the relationship) between the film thickness and the number of coatings with the PT films and the PZT films stacked on one another.

According to this invention, a thin seeding layer is provided in order to restrain reduction of the electrical properties of the resultant multi-layer films. FIG. 2 shows the relationship between the film thickness and the number of coatings with the PT films and the PZT films. In this invention, a relatively thin (40 nm) seeding layer of PT was dip-coated by the CSD process at withdrawal speed-of 10 cm/min. The thickness of PZT layer was about 60 nm by one coating.

Figure 3:
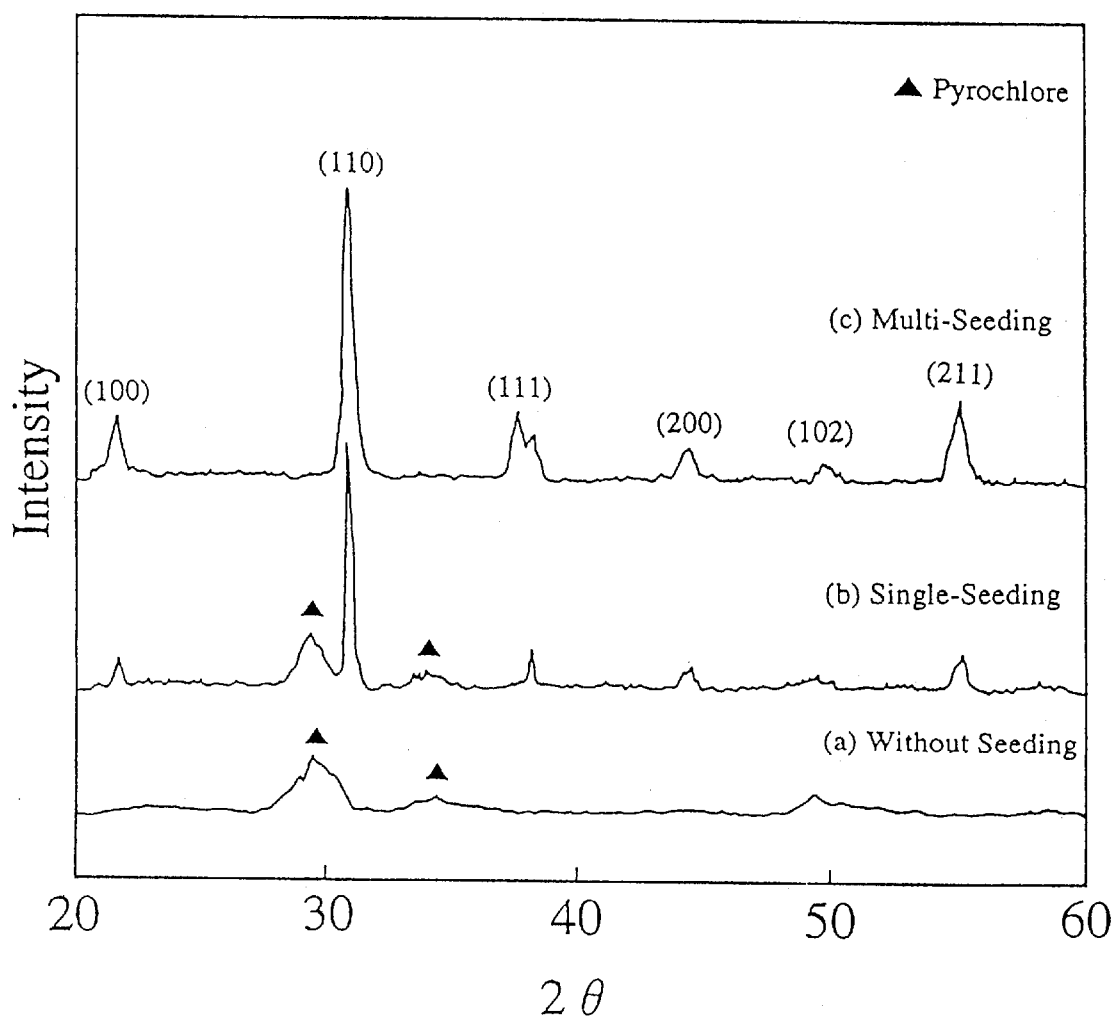
FIG. 3 shows XRD patterns of the PZT films prepared by the different processes on a silica glass substrate.

FIG. 3 shows XRD patterns of the PZT films prepared by the different processes on a silica glass substrates to compare the crystallization behavior among these films. These films were annealed at 450° C. for two hours. In case of the PZT film without seeding, crystallization proceeds poorly (FIG. 3(a)). Single-seeding process promoted the crystallization of a perovskite phase but still partially (FIG. 3(b)). It is observed that a PZT film with the multi-seeding process according to this invention has given the single-phase perovskite at a low temperature of 450° C. (FIG. 3(c)).

This result proves that the multi-seeding process of this invention is effective for a phase development of a ferroelectric perovskite PZT, even on a glass substrate or an aluminum substrate which has electric conductivity and does not require an expensive electrodes such as platinum. The PZT thin film prepared by the multi-seeding process is rich in titanium, and calculated to be about X=0.31 from the film thickness of $Pb(Zr_xTi_{1-x})O_3$. Shu et al has reported that the temperature of a single phase PZT perovskite was lowered with increasing titanium content to 550° C. for X=0.2. This proves that with the construction of this invention (the multi-seeding process) the single phase PZT perovskite thin film can be obtained at such low temperature as 450° C.

Figure 4:
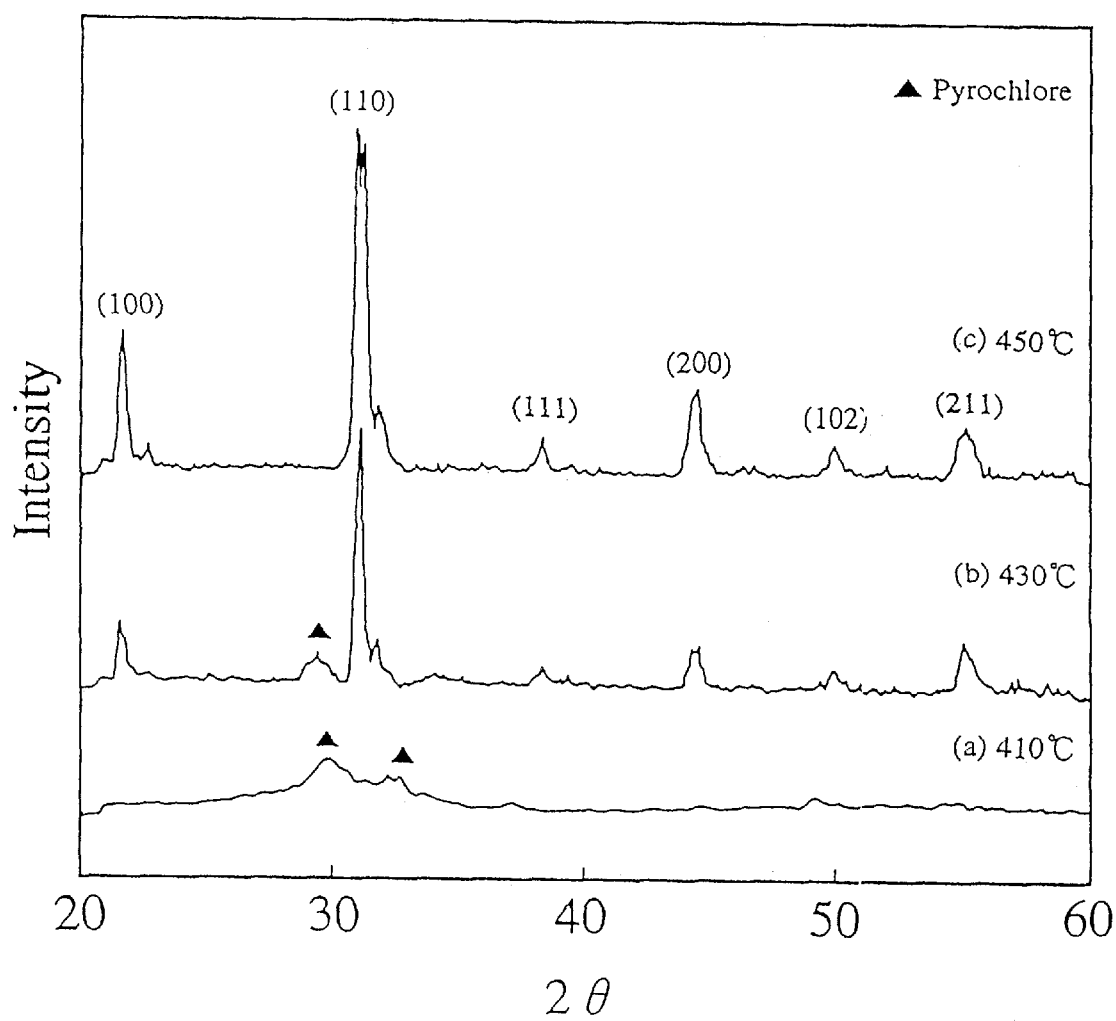
FIG. 4 shows the crystallization behavior of the PZT film prepared by the multi-seeding process.

The formation phase developed in the thin film greatly depends on the crystal symmetry and the lattice parameter of the substrate employed. FIG. 4 shows the crystallization behavior of the PZT film prepared by the multi-seeding process. In this case, crystallization started at around 410° C. At 430° C., considerable amount of pyrochlore phase converted to the perovskite phase. Finally, single-phase perovskite was identified at 450° C. without orientation. This crystallization behavior is quite similar as that of the PT seeding layer. This result also suggests that the PT seeding layers controled the crystallization behavior of the PZT layers to make the processing temperature low.

Figure 5:
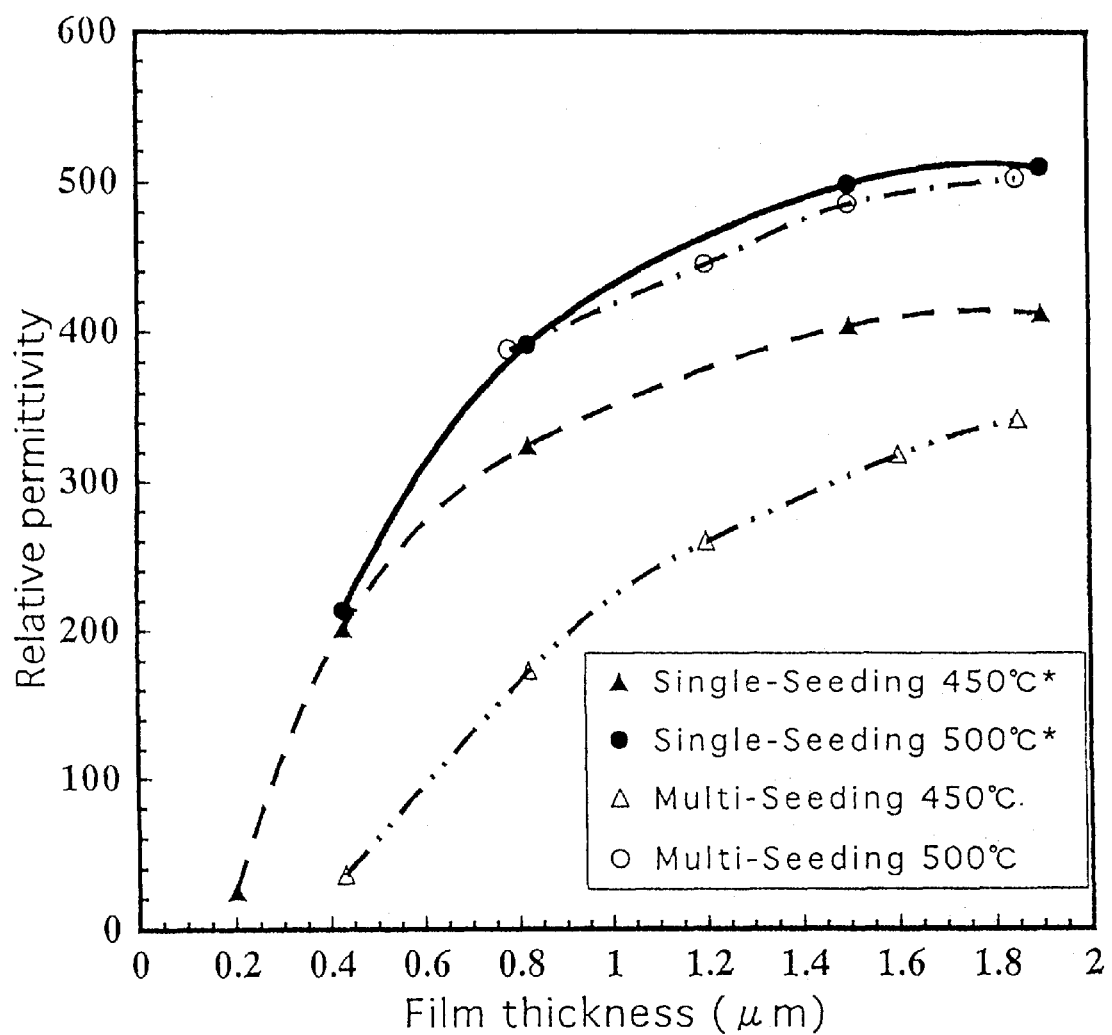
FIG. 5 shows the relative permittivities of the films prepared by the multi-seeding process for different film thickness as compared with the samples obtained by the single-seeding process.

Dielectric properties are examined and described as follows:

The relative permittivities of the resultant films for different film thickness are shown in FIG. 5 including the samples obtained by the single-seeding process. The relative permittivities of the resultant films increased with increasing film thickness as in case of the single-seeding process. The PZT film prepared by the multi-seeding process and annealed at 450° C. exhibited relatively lower permittivities independent of the film thickness.

The lower permittivity of the thin film is usually attributed to the amorphous phase formed at the interface between an electrode and a thin film by the chemical reaction during annealing. However, the lower permittivity is not only attributed to the amorphous phase but also to the composition of the resultant PZT film. In case of the PZT film prepared by the single-seeding process, its composition is in the range of the morphotoropic phase boundary (M.P.B.) which shows excellent electrical properties.

On the other hand, the PZT film obtained by the multi-seeding process consists of the stacking of two kinds of layers PZT and PT having M.P.B composition. Therefore, if the PT layers do not dissolve in the PZT layers, the relative permittivity of the resultant multi-layered film should be calculated from the serial capacitors model. As a result, the capacitace of the multi-layered film is described by the following equation:

$$C=(\epsilon_0 S)(\epsilon_{pzt}\epsilon_{pt})/(d_{pt}\epsilon_{pzt}+d_{pzt}\epsilon_{pt})$$

where C is capacity of the multi-layered film, S is area of the electrode, $d_{pt}$ and $d_{pzt}$ are thickness of the PT and PZT films, $\epsilon_{pt}$ and $\epsilon_{pzt}$ are relative permittivities of the PT film and the PZT film having M.P.B. composition respectively, and $\epsilon_0$ is permittivity of the vacuum.

The relative permittivity of about 300 for the PT ceramics has been reported by Remeika et al. Therefore, the relative permittivity of the PZT layer in the multi-layered PZT-PT film prepared by the multi-seeding process and annealed at 450° C. is estimated to be about 395. However, as shown in FIG. 5, the relative permittivity of the multi-layered film with a thickness of about 1.9 u m is 350. This estimated value is close to that of the PZT film with the same thickness and prepared by the single-seeding process. This suggests that the PT seeding layers hardly make solid solution between PZT layers at 450° C.

On the other hand, the relative permittivity of the multi-layered PZT-PT films annealed at 500° C. exhibited almost the same values as those of the PZT films prepared by the single-seeding process. From the same calculation as the above case, the estimated permittivity of the PZT layer in the multi-layered PZT-PT film is about 900. This value is very high for the PZT thin film prepared by the sol-gel process.

From the FE-SEM observation described below, the multi-layered PZT-PT film annealed at 500° C. made a solid solution which was rich in titanium (X=0.31). However, the relative permittivity of the PZT films decreased with increasing titanium content. Therefore, the dielectric property of the PZT films prepared by the multi-seeding process and annealed at 500° C. is better than that of the PZT films prepared by the single-seeding process if the compositions are the same.

Then, their microstructures have been examined as follows:

The electrical properties of a ferroelectric thin film with a perovskite structure largely depend on the microstructure and orientation of the resultant film. Highly oriented film of a perovskite structure shows excellent electrical properties. In the above description, the PZT layers in the multi-layered PZT-PT film annealed at 500° C. are supposed to have higher relative permittivity. Therefore, the microstructures of the resultant thin films prepared by the different processes and/or annealed at different temperatures were observed by the FE-SEM. The results are shown in FIGS. 6 and 7.

Figure 6A:
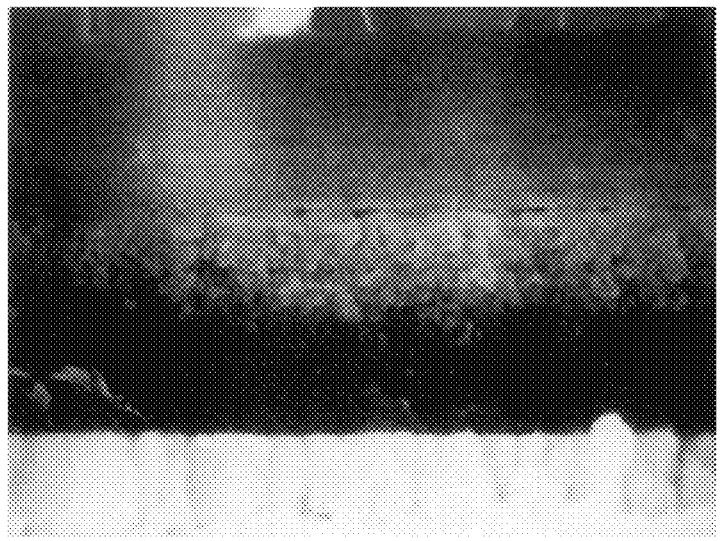
FIG. 6A shows the microstructure of the film annealed at 450° C. by the single-seeding process near the interface between electrodes and the PZT film which was taken by a field emission type scanning electron microscope (FE-SEM)
Figure 6B:
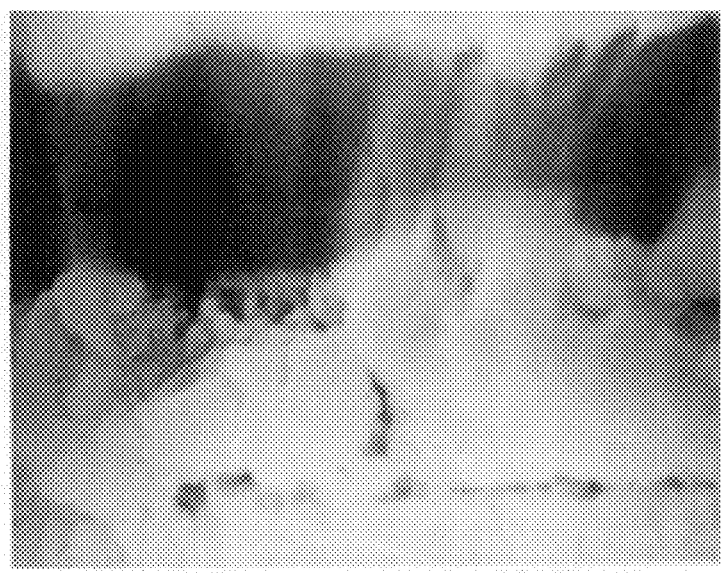
FIG. 6B shows the microstructure of the film annealed at 450° C. by the multi-seeding process near the interface between electrodes and the PZT film which was taken by FE-SEM.

FIGS. 6A and 6B show that the microstructures of the films annealed at 450° C. are not affected by the seeding process. In addition, the microstructures near the interfaces between electrodes and the PZT films are very fine and composed of many grains. These microstructures are very typical for the films prepared by the sol-gel process.

Figure 7A:
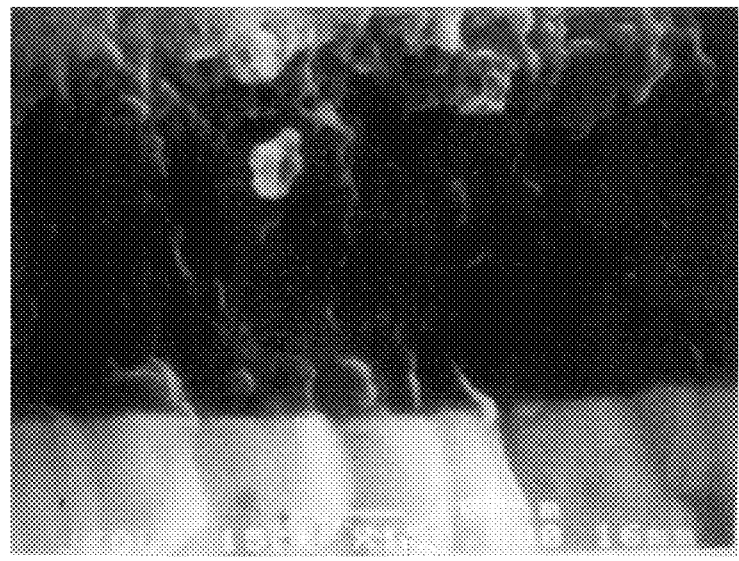
FIG. 7A shows the microstructure of the film annealed at 500° C. by the single-seeding process near the interface between electrodes and the PZT film which was taken by FE-SEM.
Figure 7B:
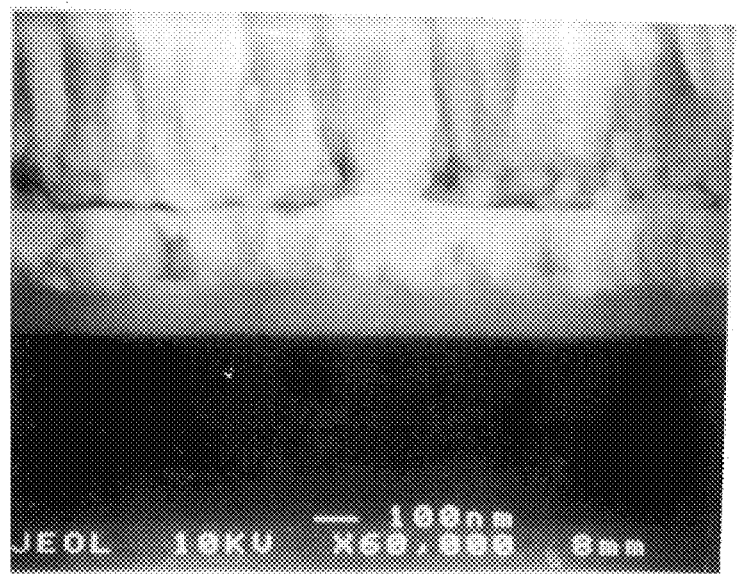
FIG. 7B shows the microstructure of the film annealed at 500° C. by the multi-seeding process near the interface between electrodes and the PZT film which was taken by FE-SEM.

On the other hand, the films annealed at 500° C. show quite different microstructures as seen in FIGS. 7A and 7B. The PZT film prepared by the single-seeding process shows almost the same microstructure as that of the films annealed at 450° C. except the grain size, while the PZT film prepared by the multi-seeding process has a columnar-like structure. This columnar-like structure is attributed to the stacking structure of the film obtained by the multi-seeding process. However, it is very difficult to recognize the formation mechanism of the columnar structure and a further investigation is required to know it.

It is also observed that the fine grains remain at the bottom of the film near the interface between the electrode and the film. Interaction between electrode and the film could not be avoided even by the multi-seeding process.

The first coating of the PT seeding layer can be a buffer layer to protect the interaction between the electrode and the film. In addition, this structure shows that a reaction occurs between the PT film and the PZT film forming the solid solution by annealing at 500° C. Therefore, the resultant multi-layered thin film has a composition rich in titanium. In spite of such titanium rich composition, the resultant film shows better dielectric property than the film prepared by the single-seeding process because of their columnar microstructure.

Figure 8:
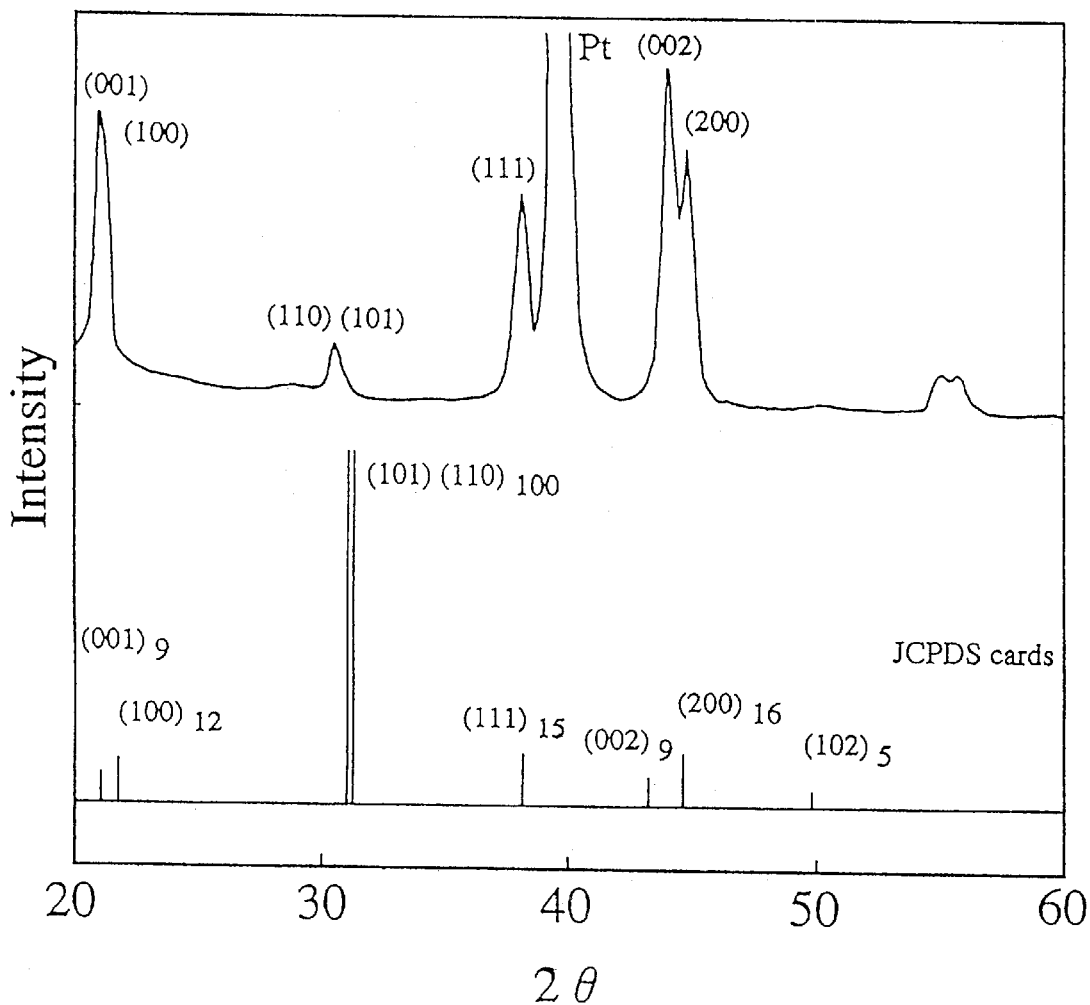
FIG. 8 shows a XRD pattern of the PZT-PT multi-layered film annealed at 500° C. together with a pattern of the PZT film with X=0.52 from the JCPDS card.

FIG. 8 shows a XRD pattern of the PZT-PT multi-layered film annealed at 500° C. together with a pattern of the PZT film with X=0.52 from the JCPDS card. The XRD pattern shows formation of the highly oriented film, although the orientation of the resultant film is not yet perfect.

The example of the functional ceramics consisting of lead, zirconium and titanium has been heretofore described. Similarly, PT layers as a seeding layer and PLZT layers (lead, zirconium, lanthanum and titanium) were alternately stacked employing together an ethoxide of lanthanum, and then annealed to form the PLZT thin film of functional ceramic. This multi-layered film has also shown a single phase perovskite structure at low temperature of 450° C. as well as the PZT thin film.

As described, a novel method for preparing excellent composite oxide thin films at low temperature was developed with the multi-seeding process according to this invention, thus affording the use of cheap substrates. Further, the production cost can be lowered because of economical annealing installations and energy saving.

What is claimed is:

1. A wet coating process for forming a functional ceramic thin film having a crystals of a composite oxide consisting of two or more metal elements and oxygen, the process comprises the steps of alternately stacking seeding layers and composite metal oxide layers to form a resulting stacked layer the seeding layers having the same crystalline structure as said composite metal oxide and formable at a temperature lower than the crystallization temperature of the composite metal oxide, and said composite metal oxide layers containing a greater amount of a designated metal element than said seeding layers, and annealing the resultant layer to form an integral body.

2. A process for forming a functional ceramic thin film as claimed in claim 1, wherein the content of said designated metal element in the seeding layer is zero.

3. A process for forming a functional ceramic thin film as claimed in claim 1 or 2, wherein the composite metal oxide layer is prepared by chemical solution deposit (CSD) process.

4. A process for forming a functional ceramic thin film as claimed in claim 1, or 2, wherein said functional ceramic thin film comprises a composite metal oxide of lead, zirconium and titanium having perovskite-type crystal structure.

5. A process for forming a functional ceramic thin film as claimed in claim 4, wherein said designated metal element is zirconium.

6. A process for forming a functional ceramic thin film as claimed in claim 1, or 2 wherein said functional ceramic thin film comprises a composite metal oxide of lead, lanthanum, zirconium and titanium having perovskite-type crystal structure.

7. A process for forming a functional ceramic thin film as claimed in claim 6, wherein said designated metal element is zirconium and lanthanum.

\* \* \* \* \*